Patented Mar. 4, 1930

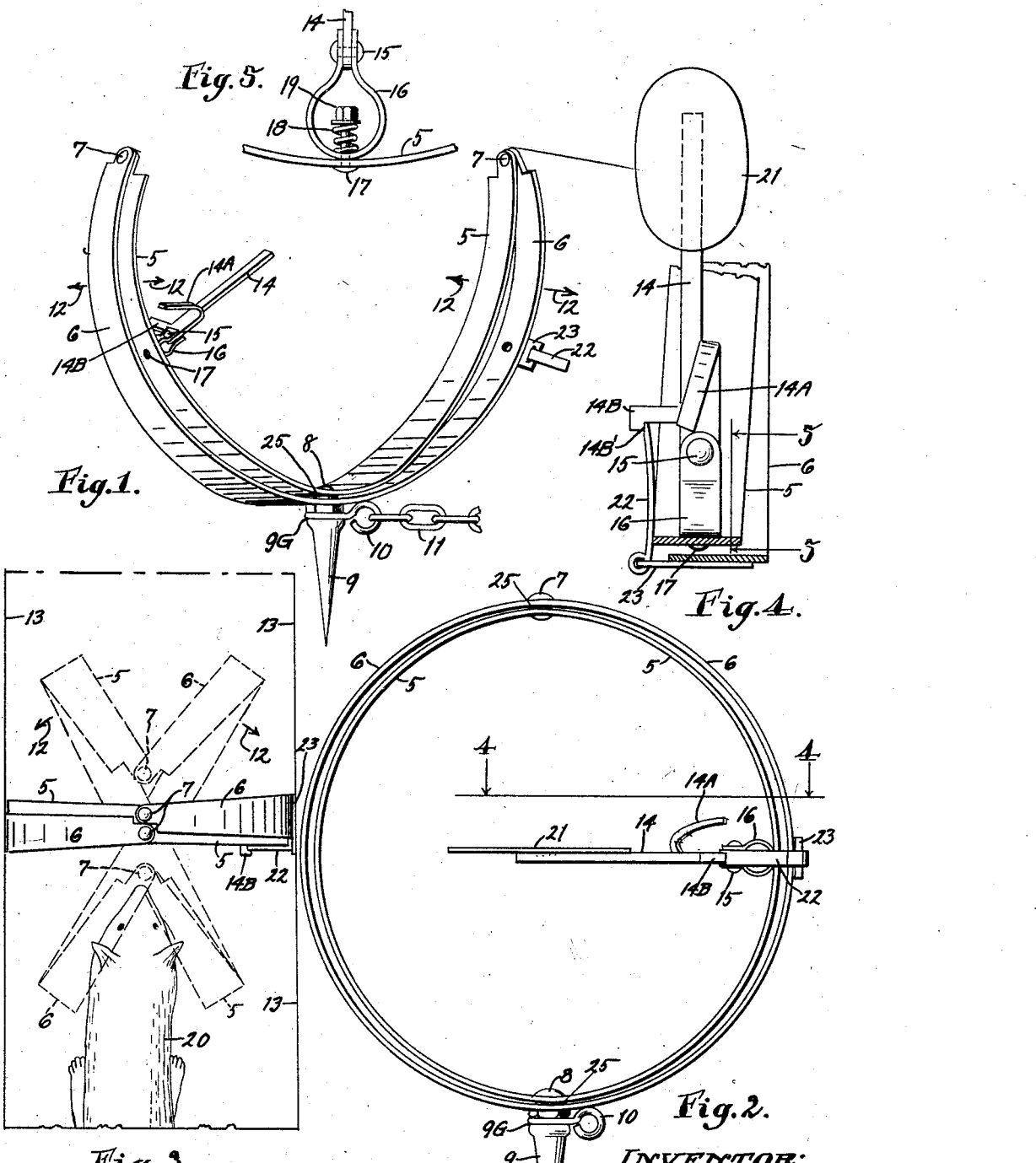

1,749,372

UNITED STATES PATENT OFFICE

FRED C. BLOOM, OF ST. PAUL, MINNESOTA

ANIMAL TRAP

Application filed March 15, 1928. Serial No. 261,878.

My invention relates to animal traps and the main object is to provide a simple, inexpensive and efficient trap of a new and novel construction as hereinafter fully described and as illustrated in the accompanying drawing, in which,—

Fig. 1 is a perspective view of my improved trap in sprung position.

Fig. 2 is a top or plan view of my trap in set position.

Fig. 3 is a top view of my trap as set in a vertical position in a runway, the dotted line position indicating the trap in a position about to catch an animal.

Fig. 4 is an approximately full size sectional detail of the trigger and release means therefor, shown in one of two operative positions.

Fig. 5 is an enlarged detail of the pivoted trigger yoke of my device.

Referring to the drawing by reference numerals the main parts of my trap comprising the animal catching means consists of two arched flat metal spring bars 5 and 6 of which 5 is the inner and 6 the outer one, both preferably tapered at their opposite ends and pivotally connected as at 7 at said ends. Midway between said pivotally connected ends the members are also pivotally connected by a suitable bolt 8 to which a prong 9 may be removably fixed exteriorly of the members said prong being provided with a groove 9G for retaining a ring 10 to which is attached a chain 11.

The spring arms 5—6 are of course made of spring steel or an equivalent material and are normally in free or sprung condition open as in Fig. 1, that is the pairs of pivoted ends as in Fig. 1, that is the pairs as 7 are some distance apart and the arms 5—6 are approximately in alinement or parallel to each other.

To set my trap, and assuming the trap is first in sprung condition as Fig. 1, the pivoted ends 7 are first forced toward each other and then the spring members 5—6 are spread apart as indicated by arrows 12 in Figs. 1 and 3 swinging on pivot 8 and continued spreading forces the pivoted ends 7 toward each other until they are side by side and diametrically opposite pivot 8 (see Fig. 2) at which position the spring arms are in circular formation and in a plane at right angles to sprung original position. In Fig. 3 the trap is shown in set position transversely within an underground runway 13, this view looking down on the pivoted ends 7. To hold the bands or arms 5—6 in set position I provide a pivotally mounted bait lever 14 pivotally secured at 15 between the arms of a yoke 16 of clip shape (see Fig. 5). 17 is a bolt in the spring 5 about half way between pivots 7—8 and engaging yoke 16. 18 is a compression coil spring about said bolt within the yoke 16 and adapted to be compressed between the said rear part of the yoke and a nut 19 on the said bolt. The lever 14 is preferably flat and obviously will swing on pivot 15 in a plane at right angles to the plane of yoke 16, said lever extending normally toward the center of the trap and in the pathway of an animal, as 20 in Fig. 3 or said lever may carry a step plate as 21 in Fig. 4. The lever 14 may also be used as a bait holder. 14A is a branch arm of lever 14 bent back toward its fulcrum at an obtuse angle from its free end to a point preferably in spaced relation above pivot 15 (as in Fig. 1). The end of said arm is thus directed toward and located inwardly of band 5 and may be engaged on its underside by a flat trigger bar 22 fulcrumed in a bracket 23 fixed on outside of spring arm 6. 14B is another arm extending at right angles from lever 14 and in common plane therewith and having an outwardly directed notch or shoulder 14B′ which may also be engaged by trigger 22 (as in Fig. 4). Thus it will be understood that lever 14 may be engaged in either of two positions, but in both positions of said lever it extends of course inwardly and radially of the trap spring members 5—6 when the trap is set. When in said latter position the spring arms have a powerful pressure tending to spread the pivoted parts 7 apart and simultaneously to spread the arms apart as from full line position toward dotted line positions in Fig. 3. The said spreading of the arms and the resulting pivotal action closing the arched parts of arms 5—6 toward each other takes place of course only after the trigger 22 has been caused to be released from either the arm 14A or the catch 14B' by an animal 20 coming in contact with lever 14 and causing the latter to move only enough to release the trigger 22. It is obvious that arms 5—6 close toward each other both ways from pivot 8 and will catch an animal between their adjacent closing edges regardless of which side of the set trap the animal approaches it, the shoulders of members 5 and 6 near their pivots 7 (as shown in Figs. 1 and 3) enable the said pivots to be brought close together in setting the trap.

With the step plate in a common plane with my device when in set position it is obvious that the trap is laid on the ground and the trap may be hidden in any suitable manner in any open path used by animals desired to be caught or it may likewise be set in any locality where such animals are expected to be in.

When the lever 14 is set as in Fig. 4 it will be seen that a very slight movement of it will release trigger member 22. Because of the width of the sprung members 5 and 6 it is necessary to use spacer washers 25 between them on the pivots 7 and 8 so that they will clear each other.

I claim:—

1. An animal trap comprising a pair of arched flat-spring metal arms one within the other and their adjacent ends pivotally connected, a main pivot member connecting said arms intermediate said ends, said arms normally in approximately a common plane when sprung and their pivotally connected end parts in spaced relation, said spaced end parts adapted to be sprung toward each other and the arms simultaneously spread apart to spring the arms to approximately circular set formation in a plane at right angles to the first described sprung position, and means for holding said arms in the set position.

2. The structure specified in claim 1 in which said holding means comprises a yoke mounted to swivel on the inner one of said arms at a point intermediate the main pivot and one end pivot of the said arm, a trip bar fulcrumed in the inner part of said yoke, and normally extending radially inwardly from the yoke, a trigger pivotally mounted on the outer arm, and dual trigger engaging means on said trip bar arranged to be engaged selectively by said trigger.

3. The structure specified in claim 1 in which said holding means comprises a yoke mounted to swivel on the inner one of said arms at a point intermediate the main pivot and one end pivot of the said arm, a trip bar fulcrumed in the inner part of said yoke and normally extending radially inwardly from the yoke, a trigger pivotally mounted on the outer arm, and dual trigger engaging means on said trip bar arranged to be engaged selectively by said trigger, and a step plate fixed on said trip bar adjacent its free end.

4. The structure specified in claim 1 in which said dual trigger engaging means on the trip bar comprises a side arm formed integral with said trip bar and provided with a notch adapted to be engaged by the free end of said trigger, and an auxiliary arm at right angles to said side arm and projecting outwardly, its free end adapted to be engaged by the free end of said trigger.

In testimony whereof I affix my signature.

FRED C. BLOOM.